United States Patent [19]

McMillen et al.

[11] Patent Number: 5,195,402
[45] Date of Patent: Mar. 23, 1993

[54] DIRECT DRIVE SYSTEM FOR A BALER

[75] Inventors: Kenneth R. McMillen, Loda, Ill.;
Wallace L. Edwards, Stockton, Mo.

[73] Assignee: Vermeer Manufacturing Company, Pella, Iowa

[21] Appl. No.: 648,564

[22] Filed: Jan. 31, 1991

[51] Int. Cl.⁵ ............................. F16H 37/06; B30B 5/06
[52] U.S. Cl. ......................... 74/665 GC; 74/665 GE; 74/15.4; 475/218; 56/341; 100/88
[58] Field of Search .......... 74/665 GC, 665 GE, 15.4, 74/15.6; 475/207, 218; 56/341; 100/88

[56] References Cited

U.S. PATENT DOCUMENTS

| | | | |
|---|---|---|---|
| 1,496,363 | 6/1924 | Bonnafoux | 56/341 |
| 2,790,336 | 4/1957 | Bornzin | 74/665 GC |
| 3,897,841 | 8/1975 | Phillips et al. | 74/15.69 X |
| 4,024,804 | 5/1977 | Hanson | 100/88 X |
| 4,294,346 | 10/1981 | Decoene et al. | 56/341 X |
| 4,470,247 | 9/1984 | Mast | 100/88 X |
| 4,615,238 | 10/1986 | Cheatum | 74/665 F X |
| 4,635,543 | 1/1987 | Clostermeyer et al. | 74/67 X |
| 4,656,820 | 4/1987 | Jennings | 100/88 X |
| 4,731,984 | 3/1988 | van der Lely | 100/88 X |

Primary Examiner—Leslie A. Braun
Assistant Examiner—Benjamin Levi
Attorney, Agent, or Firm—Kent A. Herink; Brian J. Laurenzo

[57] ABSTRACT

A direct drive system for a baler of large round bales. A plurality of driven gearboxes, each of which has a planetary gear system and an interconnected bevel gear system, are located on a side wall of the baler and are each drivably connected to one of a plurality of transverse driven shafts of the baler. A distribution gearbox on the side of the baler is connected through a right angle gearbox to the power take-off of a tractor. Power from the distribution gearbox is distributed to the plurality of driven gearboxes through a plurality of driven gearboxes through a plurality of lateral drive shafts. The direct drive system of the present invention replaces substantially all of the roller chain and sprocket drive system of known balers.

22 Claims, 7 Drawing Sheets

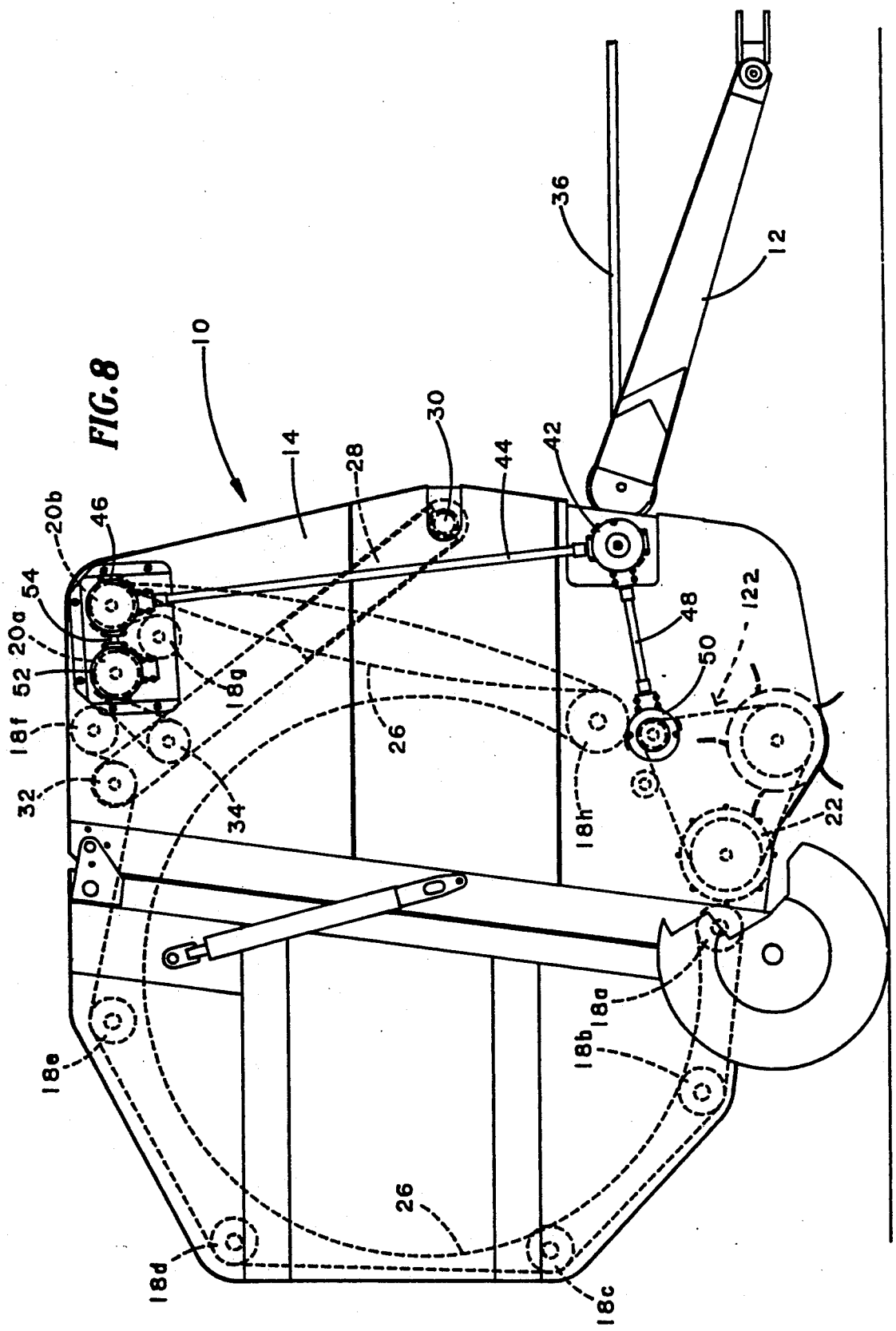

DIRECT DRIVE SYSTEM FOR A BALER

BACKGROUND OF THE INVENTION

The invention relates to direct drive systems for agricultural equipment and, more specifically, to a drive train for a baler for large round bale consisting of gear boxes and interconnecting shafts.

In recent years, the agricultural practice of collecting crop materials, such as corn stalks, straw, green forage crops, and grasses, has been revolutionized by baling machines which produce large round bales of up to approximately six feet in diameter. Examples of such baling machines are described in U.S. Pat. No. 3,722,197 and No. 4,172,354. Such machines include two, opposite and spaced apart side walls that support a plurality of transverse shafts or rollers extended therebetween. A plurality of endless belts are trained about the shafts and define a baling chamber in which the large round bale is formed. A crop pick-up mechanism picks up crop material off the ground and feeds it into the baling chamber where the plurality of endless belts roll and compress the crop material into a large round bale.

Most such baling mechanisms are driven from the power take-off of a tractor which is used to pull the baling machine over the ground. A main drive sprocket located on the outside of one of the side walls is interconnected to the tractor power take-off typically by a 90-degree gear box. A plurality of roller chains are used to transmit rotation of the main drive sprocket to certain of the transverse shafts for driving the shafts and thereby the plurality of endless belts. A roller chain also is used to transmit rotation of the main drive sprocket to a drive mechanism for the crop pick up means.

The roller chains and sprocket drive mechanism suffers from a number of draw backs and limitations. The chains must be constantly lubricated by a brush and drip system or the like. Although the chains are typically housed behind a shield, the baling operation gives rise to large amounts of chaff and other finely divided crop material that finds its way inside the housing and collects on the oiled chains and sprockets. Roller chains also stretch as a result of use and so to maintain the required tension require either the use of a spring-loaded idler or the like or periodic adjustment. Further, the endless chains carry a substantial load during operation and can, if improperly maintained, break and cause bodily injury to an operator.

SUMMARY OF THE INVENTION

An object of the present invention is to provide a drive train for a baler which does not use roller chains.

Another object of the present invention is to provide a drive train for a baler wherein a gear box is associated with a driven end of each transverse belt drive roller of the baler.

A further object of the invention is to provide a drive train for a baler wherein drive shafts interconnect the gear boxes to a main drive gear box.

Yet another object of the invention is to provide a drive train for a baler that is more efficient, less subject to collect dirt, and safer than chain and sprocket drive trains.

Still a further object of the invention is to provide a drive train for a baler which permits the easy disassembly of the driven transverse shafts from the gear boxes to facilitate repairs of the drive system.

Yet another object of the invention is to provide an improved drive train for a baler which will permit the assembly of the baler from components by nonfactory personnel so that the balers can be transported in a knocked-down condition thereby greatly reducing the shipping volume of the baler and, accordingly, the cost of shipment.

Other objects and advantages of the invention will be apparent from the following description of the invention.

BRIEF DESCRIPTION OF THE DRAWINGS

FIG. 8 is a side view of an alternative embodiment of the baler in which the drum roller is driven by a chain rather than a separate gear box.

FIG. 10 is a front elevational view of a baler including a second embodiment of the invention wherein gearboxes are mounted on both sidewalls of the baler; and FIG. 11 is a perspective view of the gear boxes and interconnecting drive shafts of the second embodiment.

DETAILED DESCRIPTION OF A PREFERRED EMBODIMENT

Figure 1:
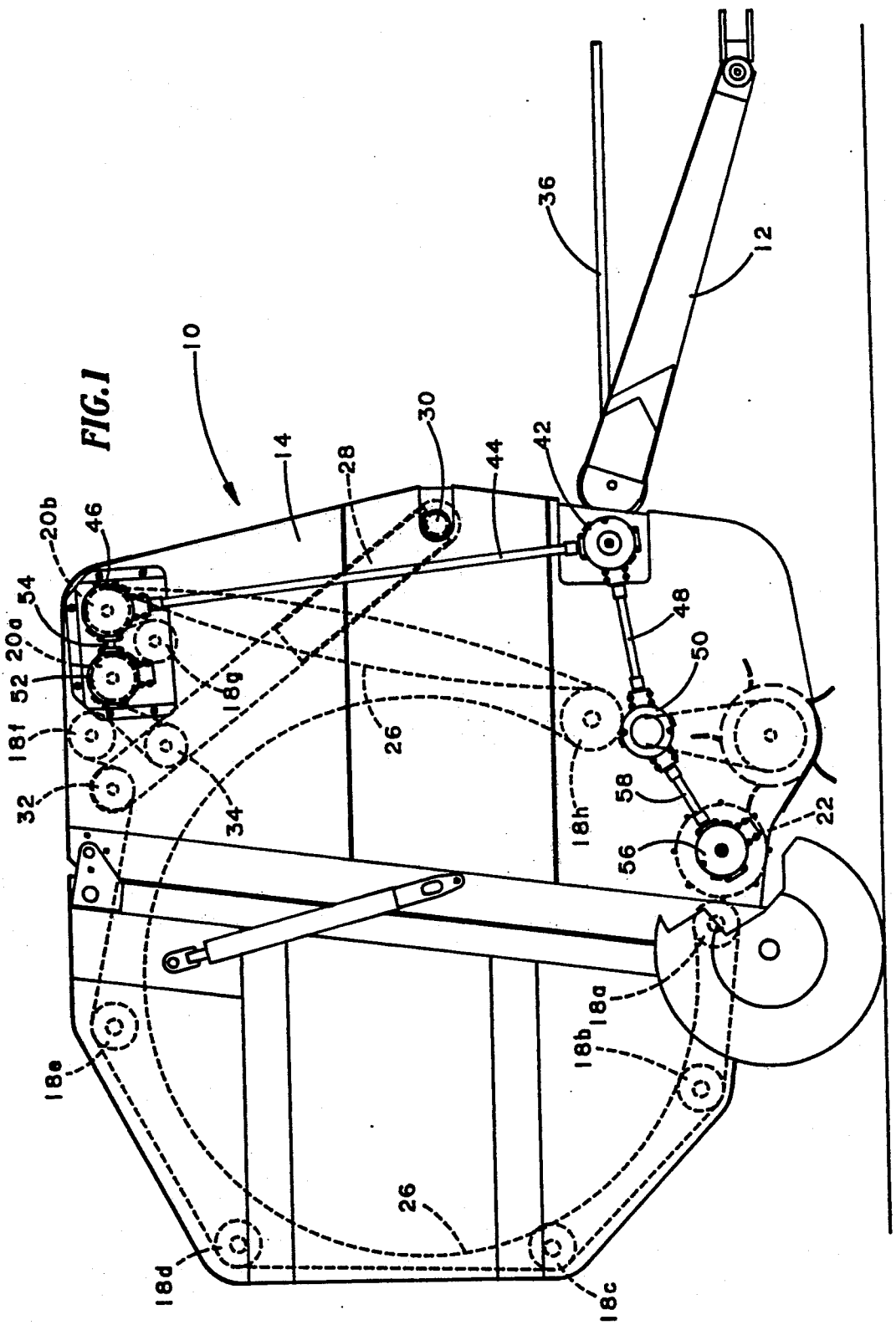
FIG. 1 is a side view of a baler on which has been mounted the direct drive system of the present invention.
Figure 2:
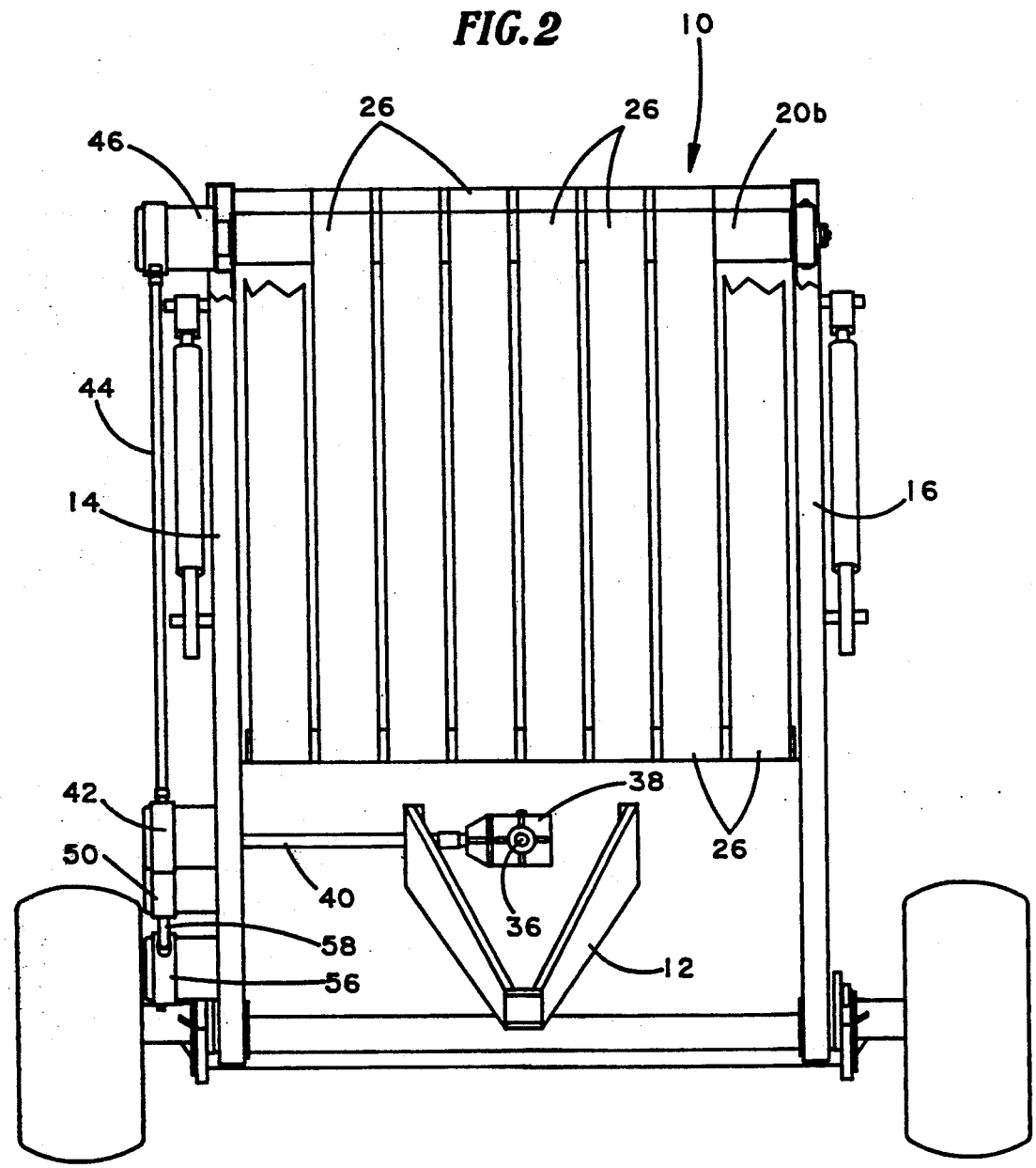
FIG. 2 is a front elevational view of the baler of FIG. 1.
Figure 6:
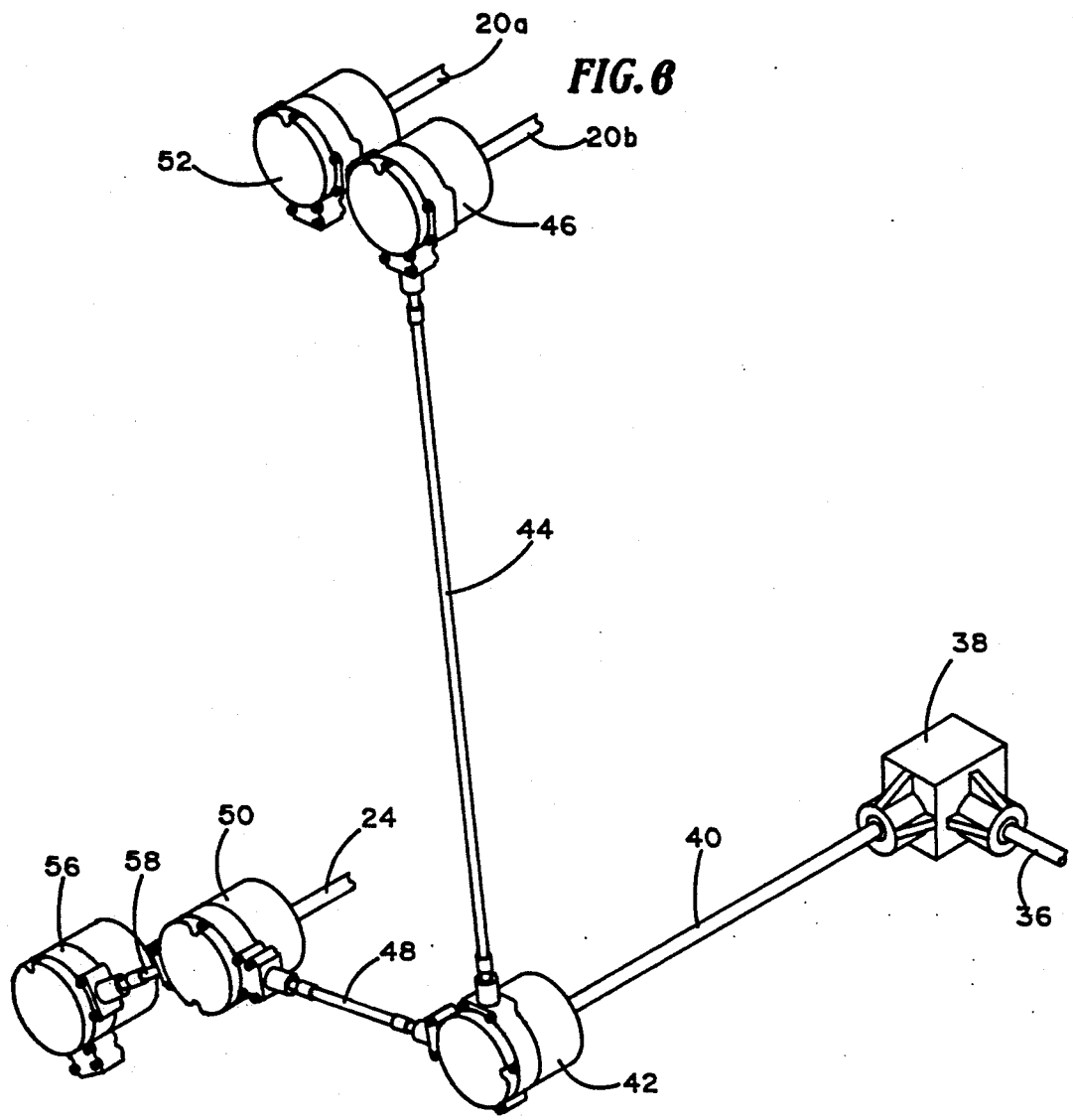
FIG. 6 is a perspective view of the gear boxes and interconnecting drive shafts of the direct drive system.

There is illustrated in FIG. 1 generally at 10 a tractor drawn, ground supported baler for forming large round bales of crop material. A draw tongue 12 extends forwardly of the baler 10 for attachment to a tractor (not shown) or similar motive means. As best illustrated in FIG. 2, the baler has a pair of opposite side walls, right side wall 14 and left side wall 16. Extended between the side walls 14 and 16 are a plurality of transverse shafts or rollers including idler belt rollers 18a-h, driven belt rollers 20a and 20b, drum 22, and a starter roller 24 (FIG. 6). The rollers 18 and 20 and drum 22 have stub shaft end portions while the starter roller 24 has a through shaft. A plurality of endless belts 26 are trained about the idler belt rollers 18 and driven belt rollers 20. A belt tension arm 28 is pivotally attached at 30 to both side walls 14 and 16. The free end portion of the belt tension arm 28 carries a pair of idler rollers 32 and 34 about which the plurality of belts 26 are also trained. As is well known, the belt tension arm 28 maintains the appropriate tension in the plurality of belts 26 during formation of a bale. The belt tension arm 28 and endless belts 26 are shown in FIG. 1 in the position wherein a fully formed bale is inside the baler 10.

In the formation of a bale, the belts 26 are moved in a direction so that the nearly vertical runs at the front of the baler 10 travel in the upward direction. Motion of the belts 26 is caused by frictional engagement thereof with the driven transverse rollers 20a and 20b. The baler is operated from the power take-off of a tractor through a direct drive train illustrated diagrammatically in FIG. 6. The tractor power take-off is connected to an input shaft 36 of a right-angle gear unit 38 of the conventional type. An output shaft 40 of the right-angle gear unit 38 extends transversely outside of the side wall 14 to a main gear box unit 42. A first output or drive shaft 44 extends vertically from the main gear box unit 42 to a first driven roller gear box unit 46. A second output or drive shaft 48 extends from the main gear box unit 42 rearwardly to a starter roller gear box 50. A second driven roller gear box 52 is driven by a short output or drive shaft 54 (FIG. 1) of the first driven roller gear box unit 46. A drum roller gear box unit 56 is driven by an output or drive shaft 58 of the starter roller gear box unit 50. Each of the gear boxes 42, 46, 50, 52 and 56 are mounted on the side wall 14. Energy for rotating the transverse shafts and rollers 20a, 20b, 22, and 24, is transmitted from the power take-off of the tractor through the direct drive train.

Figure 3:
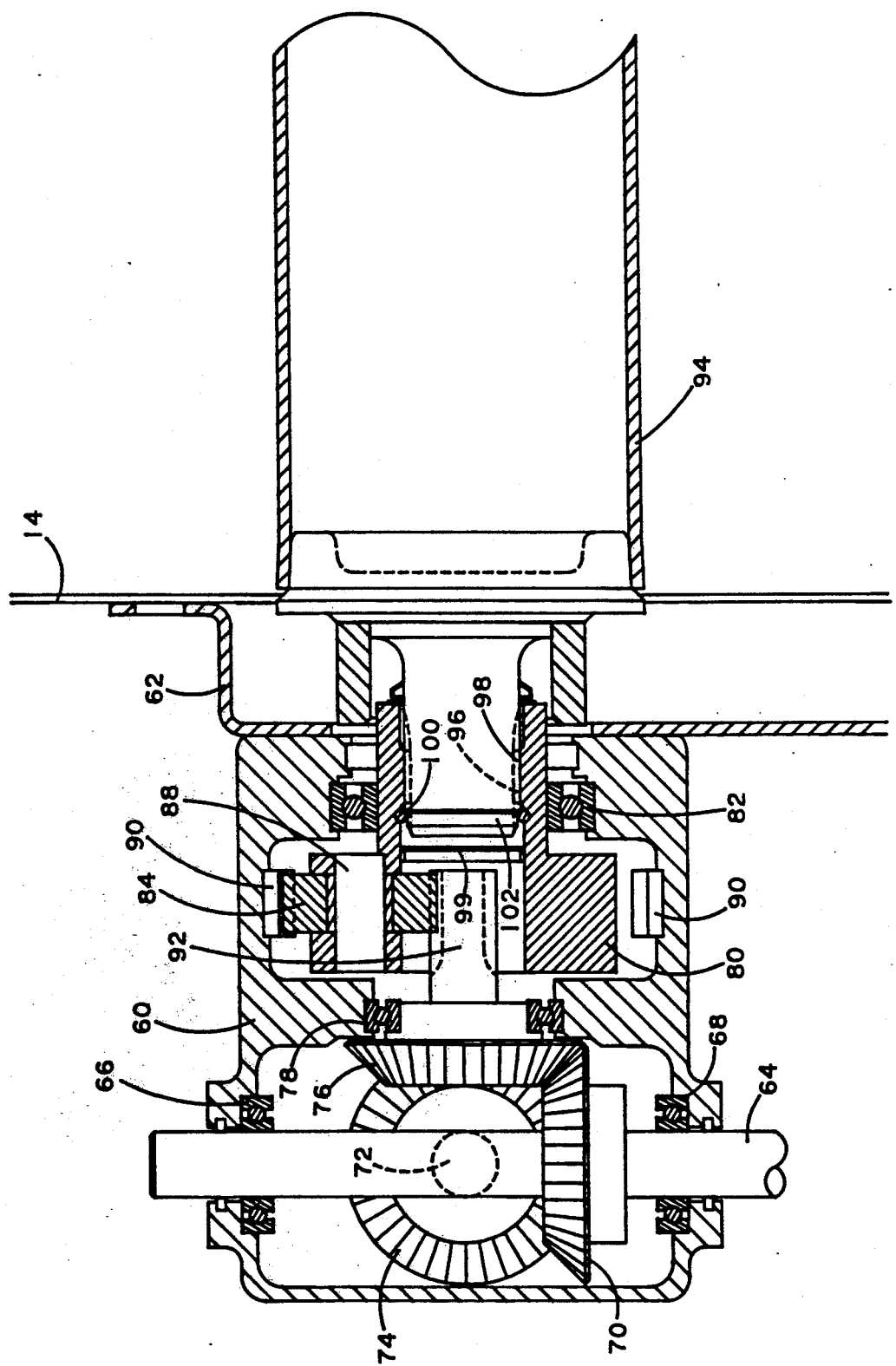
FIG. 3 is an enlarged detail sectional view through one of a plurality of gear boxes mounted on a side wall of the baler.

Each of the gear box units 42, 46, 50, 52, and 56, are very similar in construction. A representative gear box is illustrated in FIG. 3. The gear box unit includes an outer housing 60 which is mounted on a mounting flange 62 that is secured to the side wall 14 of the baler. The housing 60 encloses a bevel gear system and a planetary gear system. In the gear box illustrated in FIG. 3, the end portion of a first shaft 64 (which may be any of the shafts 44, 48, 54 or 58) is rotatably mounted to the housing 60 by a pair of bearings 66 and 68. A bevel gear 70 is carried on the shaft 64. A second shaft 72 (which may be any of the corresponding ones of the shafts 44, 48, 54 or 58) also has an end portion rotatably mounted to the housing 60 and carries a bevel gear 74. Each of the bevel gears 70 and 74 are in drivable meshing engagement with an axial bevel gear 76 which is mounted inside the housing 60 by a bearing 78 for rotation about an axis substantially perpendicular to the side wall 14. Thus, rotation of either first shaft 64 or second shaft 72 will result in corresponding rotation of the other shaft and of the bevel gears 70, 74 and 76.

Figure 4:
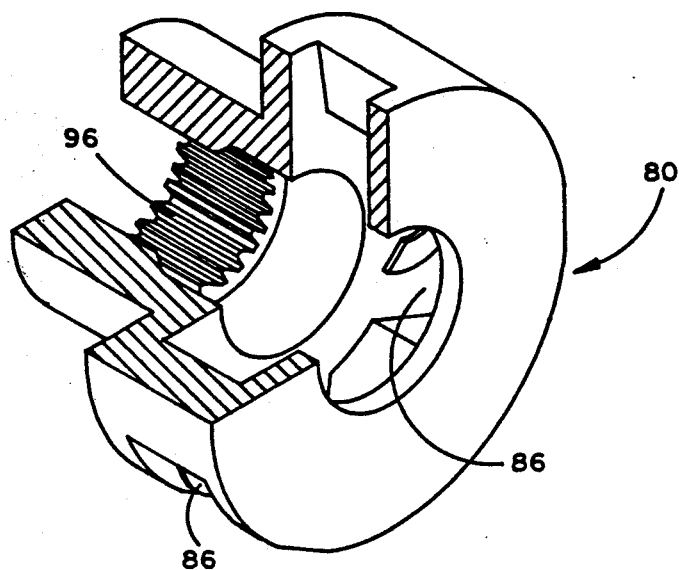
FIG. 4 is a partial sectional view of a planet carrier ring of the gear boxes.

The planetary gear system inside the housing 60 includes a planetary gear carrier 80 (FIG. 3 and 4). A bearing 82 supports the planetary gear carrier 80 for rotation inside the housing 60 in coaxial alignment with the axial bevel gear 76. The planetary gear carrier 80 carries three planetary gears 84 equally spaced about the central axis thereof, each planetary gear 84 being supported for rotation inside a recess 86 about a shaft 88. The planetary gears 84 are in driving engagement with an internal ring gear 90 on an internal circumference of the housing 60. The planetary gears 84 are also in driving engagement with a sun gear at the end portion of a shaft 92 of the axial bevel gear 76. Accordingly, the rotation of the bevel gear 76 will simultaneously rotate each of the planetary gears 84 about their respective shafts 88 of the planetary gear carrier 80. Rotation of the planetary gears 84 causes them to revolve inside the housing 60 in engagement with the ring gear 90.

A representative driven roller 94 (which may be any of the rollers or shafts 20a, 20b, 22 and 24) is illustrated in FIG. 3. An end portion of the driven roller 94 extends into the planetary gear carrier 80. Driven roller 94 and the planetary gear carrier 80 are in driving engagement by way of a spline formed by intermeshing teeth 96 of the planetary ring carrier 80 and teeth 98 of the driven roller 94. A press-fit oil plug 99 prevents the lubricating oil inside the gear box from leaking out around the roller 94.

In the preferred embodiment, a shaft support toroidal ring 100 is seated inside a recess therefor in the planetary gear carrier 80 adjacent to the teeth 98. The shaft support ring 100 provides a bearing surface for a reduced diameter shoulder portion 102 of the driven end portion of the driven roller 94.

Figures 7A, 7B:
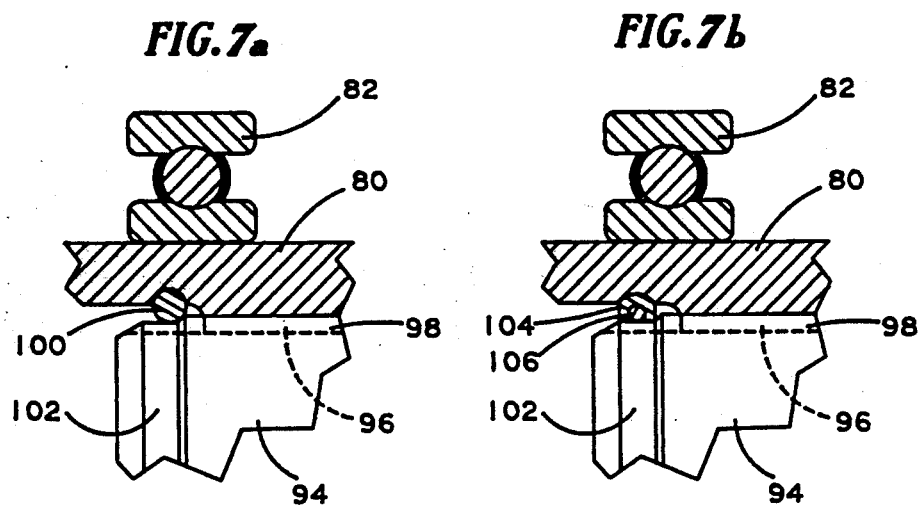
FIGS. 7a and 7b are enlarged detail sectional views of the driven end of a drive transverse shaft of the baler showing two alternative embodiments of a load bearing ring associated with the gear box.

In a second embodiment of the shaft support ring, illustrated in FIG. 7b, a larger bearing surface is provided by a wide split ring 104 that includes an inner retaining ring 106. The shaft support toroidal ring 100 permits more flexibility of the spline but presents a smaller bearing surface. The wide split ring 104 has a larger bearing surface but somewhat reduced flexibility. The selection of which of the two preferred embodiments should be used will depend on the design and application of the driven roller 94.

Figure 5:
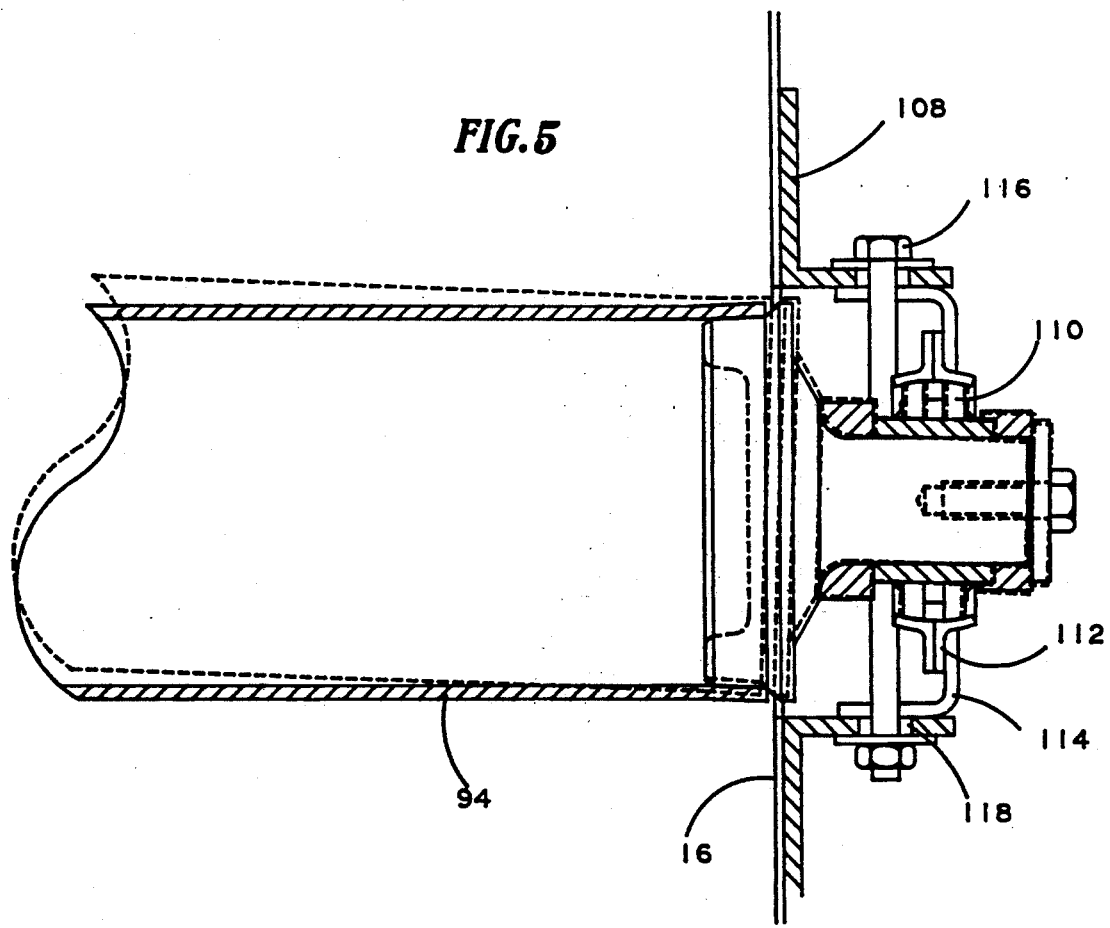
FIG. 5 is an enlarged detail sectional view of the mounting of the nondriven ends of the driven shafts mounted on a side wall of the baler opposite from the gear boxes.

The nondriven end of the driven roller 94 is illustrated in FIG. 5. A mounting flange 108 is attached to the side wall 16. A nondriven end portion of the driven roller 94 is received for rotation inside a spherical bearing 110 that is attached by way of a two-part flangette 112 to a bearing mounting bracket 114. A mounting bolt and nut combination 116 passes through and supports the bearing mounting bracket 114 and supports it on the mounting flange 108. Oversized bolt openings 118 of the mounting flange 108 permit limited adjustment of the position of the spherical bearing 110.

The spherical bearing 110 and its adjustable and somewhat flexible mounting structure will accommodate the range of axial variation in the position of the nondriven end of the driven roller 94 that commonly results between ideal design and actual manufactured machines. The spline connection at the driven end of the roller 94 also accommodates the typical variations in axial alignment of the roller 94 and its mounted ends.

In the preferred embodiment, all five of the driven transverse shafts or rollers are driven by a corresponding gearbox. The nondriven end of the starter roller 24 supports a roller chain sprocket that is drivably engaged via a roller chain with a crop pick-up of the baler. In an alternative embodiment, as illustrated in FIG. 8, the drum roller gearbox unit 56 is omitted. The drum roller 22 is instead driven off of the nondriven end of the starter roller 24 by a triangular chain drive, indicated generally at 122, including a roller chain that is trained about sprockets on the ends of the crop pick up, drum roller, and starter roller on the side of the baler opposite of the gearbox units.

In a second alternative embodiment, as illustrated in FIGS. 10 and 11, the gearboxes have been mounted on both sidewalls 14 and 16 of the baler 10. The right-angle gear unit 38 now has two out put shafts, out put shaft 40 that extends transversely outside of the sidewall 14 to the main gearbox unit 42 and output shaft 40a that extends transversely outside of the sidewall 16 to a gearbox unit 42a. A drive shaft 48a extends from the gearbox unit 42a to a gearbox unit 51 that is drivably connected to a belt roller 19 which, in this second alternative embodiment, replaces the idler roller 18h as a driven belt roller to increase the contact surface area of the belts 26 with driven rollers. Although the second alternative embodiment has been illustrated by way of providing rotational power to an additional transverse shaft or roller, any of the gearboxes 42, 46, 50 and 52 and 56 could function if mounted on either sidewall and drivably connected to the power take-off of the tractor as described above.

Figure 9:
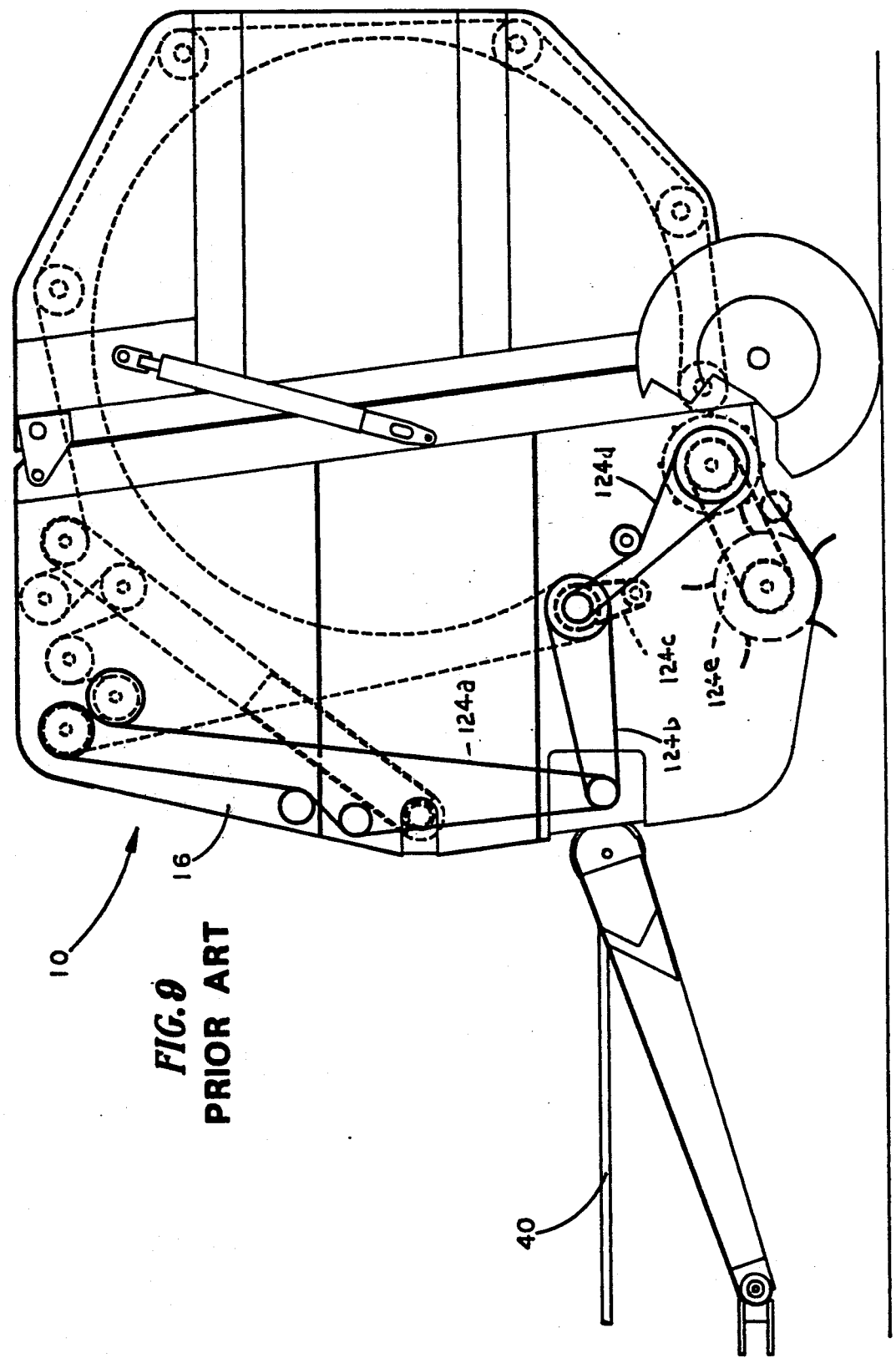
FIG. 9 is a side view of a prior art baler which has a sprocket and roller chain drive system.

The prior art balers use a roller chain drive system for all of the driven shafts and rollers (FIG. 9). The power input shaft 40 extends to the side 16 of the baler 10 from the right angle gearbox as in the preferred embodiment. Rather than gearboxes and interconnecting drive shafts, however, the driven ends of the rollers and shafts have one or more chain sprockets attached to them and five roller chains 124a–e drivably interconnect the driven rollers and shafts to the input shaft 40.

The belts used in balers heretofore have been endless loops created by joining the two ends of a strip of belting by metal "stitches". This juncture is a frequent failure site of the belts. At least one manufacturer is developing nonstitched endless belt loops that are expected to be more durable with prior art balers, however, the endless belts can only be used as original equipment, put in place when the baler is assembled. If a belt breaks after assembly, it is too inconvenient to remove an end of each of the belt rollers in order to replace a belt loop. With the present invention, the driven belt rollers 20a–b are easily removed by withdrawal of the bolt 116 at the nondriven end. The entire roller may then be removed by pulling along the longitudinal axis. The driven end of the roller will slide out of the spline of the planetary gear carrier. This feature is present on the other driven shafts and rollers as well, being inherent in the design of the gearboxes. This greatly simplifies assembly of the baler by permitting the transverse driven shafts and rollers to be assembled merely by axially aligning and then sliding the driven end into the spline of the corresponding gearbox. In contrast with the prior art, accordingly, the ease of assembly will permit the balers to be shipped in a "knocked-down" condition for later assembly by a relatively unsophisticated dealer or customer, thus offering the possibility of substantial savings on shipping costs.

In the preferred embodiment, the following drive shaft speeds and gear ratios are used (assuming tractor PTO speed of 540 rpm).

| Gear box | Planetary Side | Bevel Side |
| --- | --- | --- |
| Right angle 38 | N/A | 1:1 |
| Main gearbox 42 | 1:2.8 | 1:1.2 |
| First driven roller gearbox 46 | 4.0 | 1.35:1 |
| Second driven roller gearbox 52 | 4.0 | 1.35:1 |
| Starter roller gearbox 50 | 4.0 | 1:1 |

| Shaft | RPM |
| --- | --- |
| Input shaft 36 | 540 |
| Output shaft 40 | 540 |
| First drive shaft 44 | 1814 |
| Second drive shaft 48 | 1814 |
| Driven belt roller 20b | 334.2 |
| Short drive shaft 54 | 1814 |
| Driven belt roller 20a | 334.2 |
| Starter roller 24 | 453.6 |

The main gearbox 42 functions as the primary speed increase mechanism for the drive system. In an alternative embodiment, a planetary gear unit is added ahead of the right angle gearbox 38. This would permit lighter drive shafts to be used to transmit the same work at the higher rotational speeds.

Specific details on the flexible external involute spline that connects the ring gear carrier 80 and the drive end of the shaft or roller 94 are: (a) number of teeth=20; (b) pitch=12/24; and (c) pressure angle=30°.

Although the invention has been described with respect to a preferred embodiment thereof, it is to be understood that it is not to be so limited since changes and modifications can be made therein which are within the full intended scope of this invention as described in the following claims.

We claim:
1. A drive train for a baler, comprising:
   (a) a pair of bale-forming, opposite sidewalls;
   (b) at least one transverse driven shaft extending between said sidewalls;
   (c) at least one gearbox to which is mounted a corresponding one of said driven shafts;
   (d) a drive shaft extending to each of said gearboxes; and
   (e) rotational power means connected to each of said drive shafts.

2. The drive train of claim 1 wherein at least some of said drive shafts extend to and are driven by other of said gearboxes.

3. The drive train of claim 1 or 2 wherein said rotational power means comprises a driven distribution gearbox mounted on said baler, with each of said gearboxes being operatively connected to said driven distribution gearbox.

4. The drive train of claim 3 wherein said driven distribution gearbox includes a means for connection to a power take-off shaft of a tractor.

5. The drive train of claim 1 wherein one end of said driven shafts have first longitudinal drive surfaces that slidably engage second longitudinal drive surfaces in said gearboxes, and lock means for holding said first and second longitudinal drive surfaces in mating operational relationship, whereby said driven shafts can be slidably disengaged from said gearboxes and said baler when said lock means is removed.

6. The drive train of claim 5 wherein said first and second drive surfaces are splines.

7. The drive train of claim 5 wherein said lock means is located adjacent the ends of said driven shafts opposite to said gearboxes.

8. A power means for a baler, comprising:
   (a) a pair of bale-forming, opposite sidewalls;
   (b) at least one transverse driven shaft extending between said sidewalls;
   (c) at least one rotational power drive means mounted to a corresponding one of said driven shafts;
   (d) said rotational power drive means comprising a closed housing, and internal rotational power means therein to impart rotational motion to said transverse driven shafts; and
   (e) exterior power means connected to said internal rotational power means through said closed housing for imparting rotational power thereto.

9. The power means of claim 8 wherein said rotational power drive means are gearboxes.

10. The power means of claim 8 or 9 wherein said exterior power means are drive shafts.

11. A power means as defined in claim 8, wherein the transverse driven shafts extend from one of the sidewalls and are supported at the other of the sidewalls.

12. A drive train for a tractor-driven baler which includes a pair of transversely spaced and opposing sidewalls and a plurality of transverse driven shafts extended between the sidewalls each of which has a driven end located at a first one of the sidewalls, said drive train comprising:
  (a) a plurality of driven gearboxes one each of which is drivably connected to the driven end of one each of the transverse driven shafts;
  (b) a distribution gearbox located at the first sidewall;
  (c) shaft means drivably interconnecting said driven gearboxes and said distribution gearbox; and
  (d) means drivably interconnecting said distribution gearbox to the tractor.

13. The drive train of claim 12, wherein each of said driven and distribution gearboxes include a planetary gear system and a bevel gear system.

14. The drive train of claim 13 wherein said planetary gear system has a sun gear that includes a bevel gear end portion.

15. The drive train of claim 12, wherein said transverse driven shafts can be removed from drivable connection with said driven gearboxes by longitudinal axial movement.

16. The drive train of claim 12, wherein a spline interconnects said transverse driven shafts and said driven gearboxes to permit a limited amount of misalignment of said driven shafts.

17. The drive system of claim 16, wherein:
  (a) an endmost portion of said driven end of each of the transverse driven shafts is which is of a reduced diameter; and
  (b) a shaft support ring is received inside said gearbox driven adjacent said flexible spline for partially supporting said reduced diameter end portion of said transverse driven shaft.

18. A direct drive system for a tractor-driven baler that has a pair of transversely spaced and opposing sidewalls and a plurality of driven transverse shafts extended between said sidewalls each of which has a driven end located at a first of said sidewalls, said direct drive system comprising:
  (a) a longitudinal shaft for drivable connection to the tractor;
  (b) a transverse drive shaft one end of which extends to the first sidewall;
  (c) means drivably interconnecting said longitudinal drive shaft and said transverse drive shaft;
  (d) a distribution gearbox located on said first sidewall;
  (e) a plurality of driven gearboxes one each of which is attached to the driven end of a corresponding one of the driven transverse shafts; and
  (f) a plurality of lateral drive shafts drivably interconnecting said driven gearboxes and said distribution gearbox.

19. A direct drive system for a tractor-driven baler, comprising:
  (a) a first gearbox mounted on the baler;
  (b) a longitudinal drive shaft interconnecting the tractor and said first gearbox;
  (c) a second gearbox located on a side of the baler laterally of said first gearbox;
  (d) a transverse drive shaft interconnecting said first and second gearboxes wherein said first gearbox transmits drive power from said longitudinal drive shaft to said transverse drive shaft;
  (e) a plurality of transverse driven shafts each of which has a driven end at said side of the baler;
  (f) a plurality of driven side gearboxes each one of which is drivably attached to said driven end of one each of said transverse driven shafts; and
  (g) a plurality of lateral drive shafts for driving said driven side gearboxes from said second gearbox.

20. A drive train for a roll-forming baler, comprising:
  (a) a pair of bale-forming, opposite sidewalls;
  (b) a plurality of transverse driven shafts extending from one of said sidewalls and supported at the other of said sidewalls;
  (c) a gearbox to which is mounted at least one of said driven shafts;
  (d) a drive shaft extending from said gearbox; and
  (e) rotational power means connected to said drive shaft.

21. A drive train for a roll-forming baler, comprising:
  (a) bale-forming, opposite sidewalls;
  (b) a plurality of transverse driven shafts;
  (c) a gearbox associated with one of the sidewalls;
  (d) at least one of the transverse driven shafts is mounted to said gearbox and extends therefrom to the other of the sidewalls;
  (e) a drive shaft extending from said gearbox; and
  (f) rotational power means connected to said drive shaft.

22. A drive train for a roll-forming baler, comprising:
  (a) bale-forming, opposite sidewalls;
  (b) a plurality of transverse driven shafts;
  (c) a gearbox associated with one of the sidewalls;
  (d) at least one of the transverse driven shafts has a first end portion mounted to said gearbox and a second end portion supported by the other of the sidewalls;
  (e) a drive shaft extending from said gearbox; and
  (f) rotational power means connected to said drive shaft.

* * * * *